(12) United States Patent
Mundt

(10) Patent No.: US 9,959,240 B2
(45) Date of Patent: May 1, 2018

(54) MANUALLY CONFIGURABLE PCIE LANE COUNT FOR PCIE SSD BACKPLANE

(71) Applicant: Dell Products, L.P., Round Rock, TX (US)

(72) Inventor: Kevin Warren Mundt, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 81 days.

(21) Appl. No.: 15/098,621

(22) Filed: Apr. 14, 2016

(65) Prior Publication Data

US 2017/0300450 A1 Oct. 19, 2017

(51) Int. Cl.
*G06F 13/20* (2006.01)
*G06F 13/42* (2006.01)
*G06F 13/40* (2006.01)

(52) U.S. Cl.
CPC ...... *G06F 13/4282* (2013.01); *G06F 13/4022* (2013.01); *G06F 13/4068* (2013.01)

(58) Field of Classification Search
None
See application file for complete search history.

(56) References Cited

U.S. PATENT DOCUMENTS 8,799,702 B2* 8/2014 Buckland ............ G06F 13/4022
714/4.1

\* cited by examiner

*Primary Examiner* — Idriss N Alrobaye
*Assistant Examiner* — Richard B Franklin
(74) *Attorney, Agent, or Firm* — Fogarty LLP

(57) ABSTRACT

A configurable rack server backplane that provides either two-lane or four-lane PCIe bus connections at each the individual drive bays supported by the backplane. The backplane may be configured to provide each drive bay with a two-lane PCIe connection or a four-lane PCIe connection based on the selection of cable connectors that are provided by the backplane. The backplane may be re-configured to distribute the bandwidth of a sixteen-lane PCIe bus connection among four drive bays, each using four-lane PCIe links or among eight drive bays, each using two-lane PCIe links. The backplane may additionally support tiered distribution of the PCIe bus connection bandwidth, such as two-lane PCIe links for certain drive bays and four-lane PCIe links for other drive bays. Each two-lane and four-lane PCIe link provided by the backplane is comprised of consecutively numbered PCIe lanes of the PCIe bus connection.

9 Claims, 7 Drawing Sheets

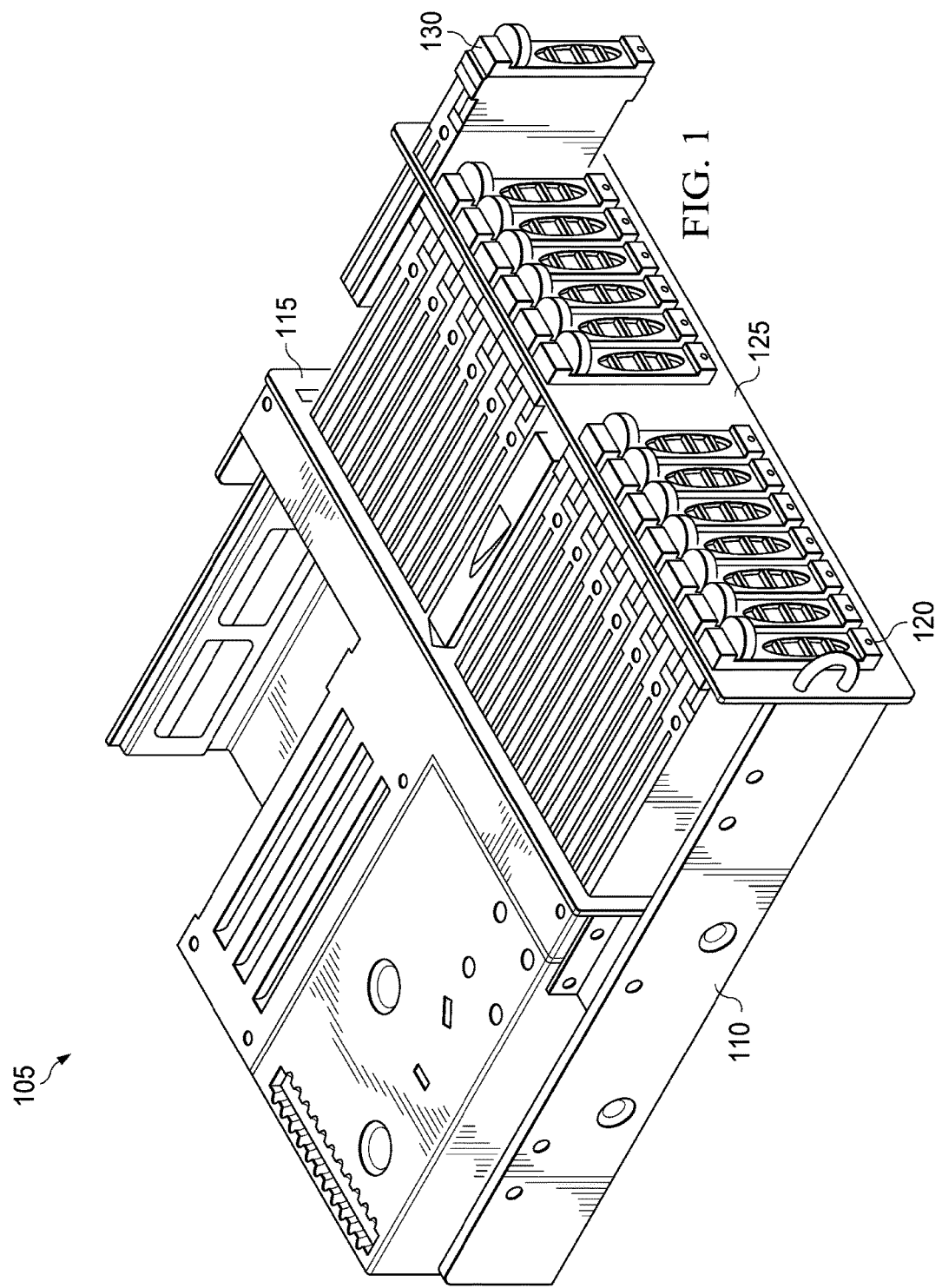

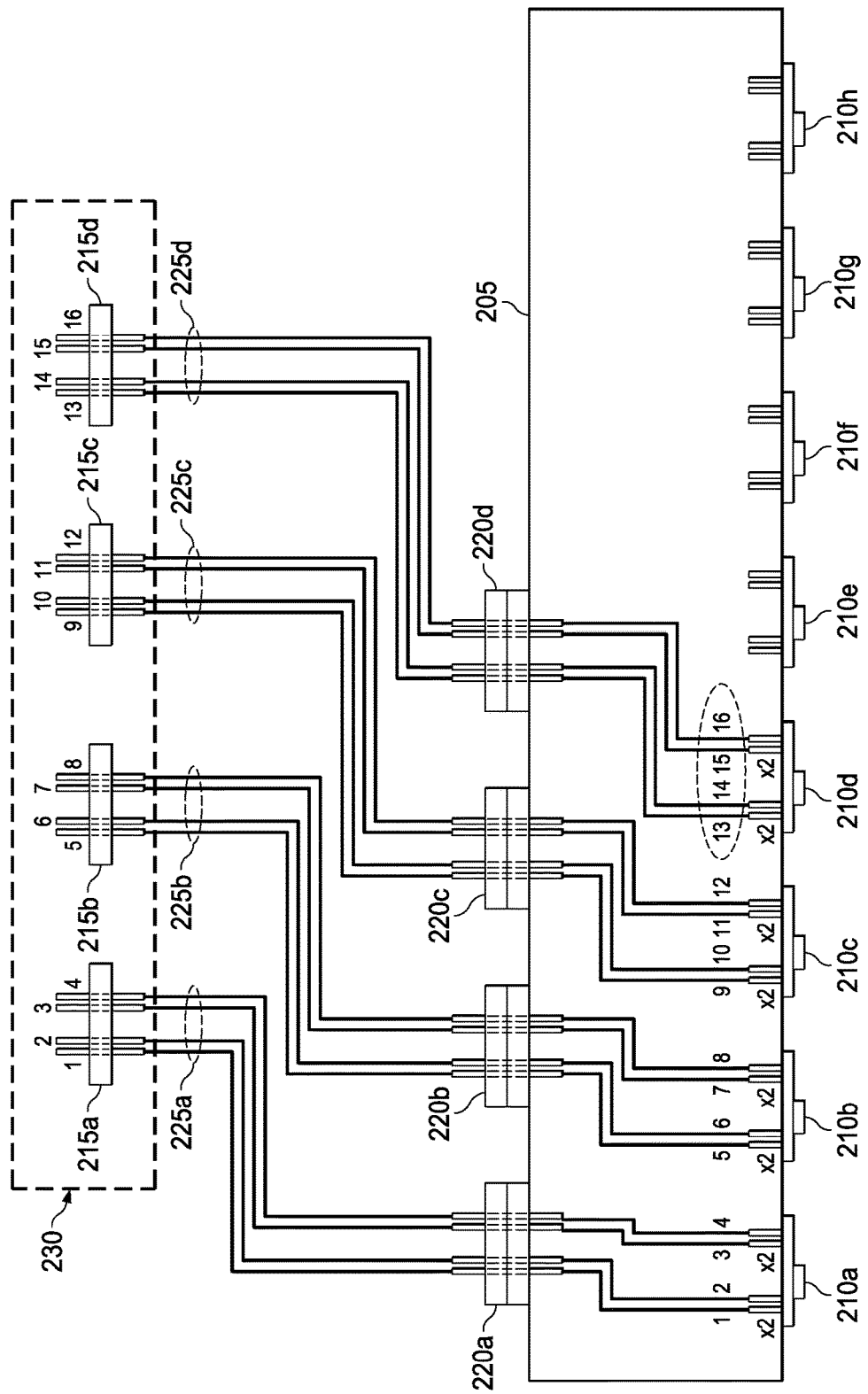
FIG. 2 ("PRIOR ART")

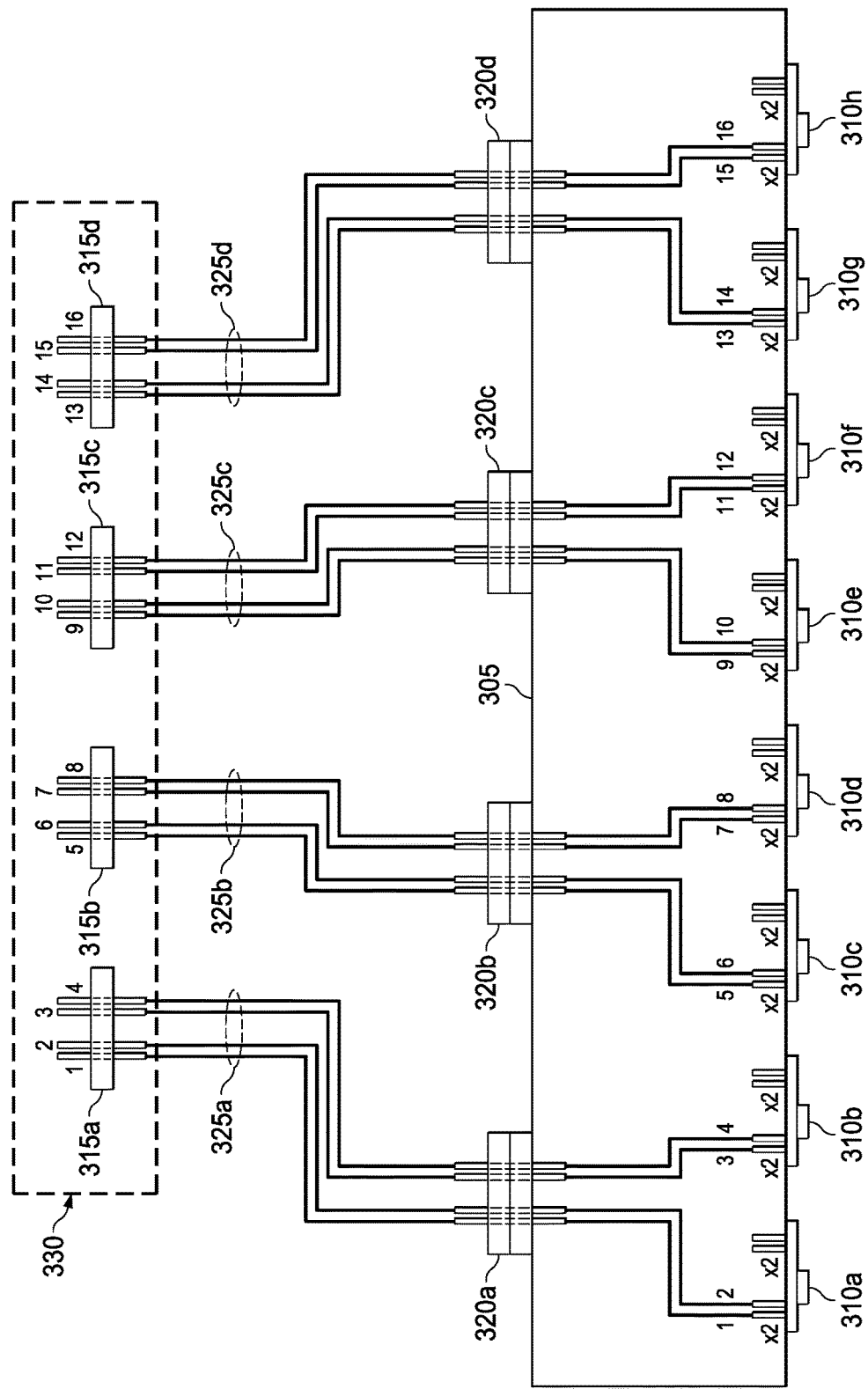
FIG. 3 ("PRIOR ART")

MANUALLY CONFIGURABLE PCIE LANE COUNT FOR PCIE SSD BACKPLANE

FIELD

This disclosure relates generally to Information Handling Systems (IHSs) utilizing rack-mounted servers, and more specifically, to support for PCIe storage devices by rack servers.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as supporting cloud services, financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, IHSs may be comprised of rack components where the rack components may each be housed within a chassis or enclosure and the chassis may be stacked within a rack. A rack may be a framed structure that is often capable of providing shared power, cooling, networking, and/or management infrastructure to one or more chassis. Examples of rack components that can be housed within chassis include, but are not limited to, input/output (I/O) modules, storage devices, and network cards. In rack-mounted applications, rack components housed within a chassis are plugged into the front of the rack and external connections to the individual rack components are made from the back of the rack. Each rack component may include a backplane printed circuit assembly that has connections for the various inputs and outputs. In certain rack-mounted IHSs, some of the rack components are rack servers that include multiple drive bays, in which storage devices can be inserted and connected to the backplane. In certain configurations, an individual storage device can be plugged into each of the drive bays in implementing various data storage solutions.

The storage devices supported by a rack server may include both magnetic storage media devices and solid-state storage devices. In such rack servers, the drive bays may be configured to each support multiple different types of storage devices. Depending on the application, users can determine whether to utilize the type of storage device to be used in each drive bay of the rack server. In some scenarios, solid-state storage devices may be desirable due to reduced latency when compared to magnetic storage devices. In order to benefit from the reduced latency of solid-state storage devices, IHSs may use the Peripheral Component Interconnect Express (PCIe) bus standard to interface with the solid-state storage devices. A PCIe bus connection may be comprised of lanes, where each lane consists of two differential pairs of signaling wires. One of the differential pairs of each lane is used for transmission of PCIe data and the other differential pair is used for receiving PCIe data. PCIe supports the linking of multiple lanes into higher bandwidth connections. One aspect of PCIe supporting the linking of multiple lanes is that linked lanes must be consecutively ordered lanes within the PCIe bus connection.

SUMMARY

Embodiments described herein provide a configurable backplane that allows multi-lane PCIe bus connections by the individual drive bays supported by the backplane, where the backplane can be configured to provide each drive bay with a two-lane PCIe connection or a four-lane PCIe connection based on the selection of connectors that are provided by the backplane. Certain embodiments may provide the ability to reconfigure the backplane through routing of four-lane cables to different connectors provided by the backplane. Due to the configurability provided by certain embodiments, a backplane can be re-configured, for instance, to distribute the bandwidth of a sixteen-lane PCIe bus connection among four drive bays, each using four-lane PCIe links or among eight drive bays, each using two-lane PCIe links. Certain embodiments may support additional configurations for distributing the PCIe bandwidth, such as two-lane PCIe links for certain drive bays and four-lane PCIe links for certain of the remaining drive bays.

According to various embodiments, a backplane may be configured to receive a PCIe bus connection, the backplane comprising a plurality of drive bay connectors, wherein each drive bay connector provides a PCIe link to a storage device; a first cable connector configured to route a first pair of PCIe lanes from the PCIe bus connection to a first drive bay connector of the plurality of drive bay connectors; and a second cable connector configured to route a second pair of PCIe lanes from the PCIe bus connection to the first drive bay connector. According to various additional embodiments, a rack server system including a processor, chassis, PCIe switch and a configurable backplane are provided. According to various additional embodiments, a method provides multi-lane PCIe links to a plurality of storage device drive bay connectors from a PCIe bus connection provided by a PCIe switch.

According to various additional embodiments, the first pair of PCIe lanes and the second pair of PCIe lanes are consecutively numbered PCIe lanes of the PCIe bus connection. According to various additional embodiments, the first drive bay connector provides a two-lane PCIe link established via the first pair of PCIe lanes. According to various additional embodiments, the first drive bay connector provides a four-lane PCIe link established via the first pair of PCIe lanes and the second pair of PCIe lanes. According to various additional embodiments, the first cable connector is connected the PCIe bus connection via a first four-lane cable and wherein the second cable connector is connector the PCIe bus connection via a second four-lane cable. According to various additional embodiments, the first pair of PCIe lanes is provided via the first four-lane cable and the second pair of PCIe lanes is provided via the second four-lane cable. According to various additional embodiments, a third pair of PCIe lanes is routed to a second drive bay connector of the plurality of drive bay connectors via the first four-lane cable. According to various additional embodiments, the first drive bay connector is associated with a first status indicator if provided with a two-lane PCIe link and is associated with a second status indictor if provided with a four-lane PCIe link.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 1 is a diagram depicting a rack server.

FIG. 2 is a high-level schematic diagram depicting certain components of conventional a backplane.

FIG. 3 is a high-level schematic diagram depicting certain components of another conventional backplane.

DETAILED DESCRIPTION

Figure 1A:
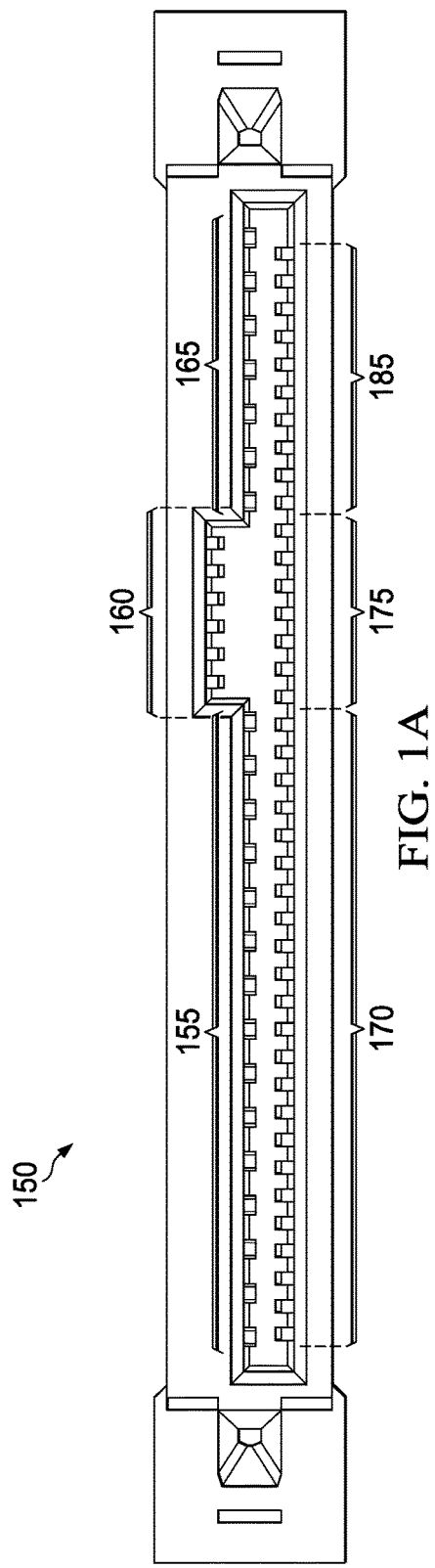
FIG. 1A is a drawing of a U.2 connector used for establishing bus connections to PCIe and SAS/SATA storage devices.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, a network router, a network video camera, a data recording device used to record physical measurements in a manufacturing environment, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

FIG. 1 depicts a rack server 105 that may be stacked within a rack that is a component of an IHS. The rack server 105 is housed within a chassis 110. Other rack servers or other components housed within a similar type chassis as the chassis 110 utilized by rack server 105 may be stacked within a rack along with rack sever 105. The rack server 105 includes a backplane 115 that separates the chassis 110 into a set of drive bays 120 at the front and a rear cavity. Various module and components may be housed within the rear cavity of the chassis 110. The rack server 105 is connected to various external resources via cables that are inserted into the rear cavity of the chassis 110. Theses external resource cables may connect to components housed in the rear cavity or may connect directly to the backplane 115.

A plurality of storage devices 120 are connected to the backplane 115 of the rack server 105. Each individual storage device 120 can be plugged 130 into a drive bay 125 at the front of the rack server 105. The types of storage devices that can be supported by rack server 105 depends in part on the connectors and wiring provided by the backplane 115. Certain backplanes may be configured to provide universal drive bays that can accommodate multiple types of storage devices. For instance the drive bays of rack server 105 may be configured to support SAS, SATA or solid-state storage devices that have housings compatible with the drive bays provided by the rack server 105. In certain rack servers, each drive bay may be associated with a backplane connector that interfaces directly with connectors provided by the storage devices. Certain rack severs may utilize universal backplane connectors such as described with respect to FIG. 1A, that interface with both SAS/SATA and PCIe storage devices.

As described, certain rack servers utilize PCIe connections for communicating with storage devices housed within the drive bays of the rack server. Rack servers may support establishing PCIe connections using standard cables that support four-lanes of PCIe traffic. Standard four-lane cables may also support SAS/SATA traffic, thus enabling the use of a single cable for either SAS/SATA or PCIe storage devices. Certain blade serves may be configured using OCuLink or Mini-SAS HD connectors that provide backplane cable connectors that are compatible with certain standard four-lane PCIe cables.

FIG. 1A illustrates the mechanical layout of a connector 150 that may be used in to support a bus connection between the rack server backplane and a PCIe or SAS/SATA storage device. The connector 150 illustrated in FIG. 1A conforms to the SFF-8639 specification, and may be referred to as a U.2 connector. The U.2 connector allows the rack server to provide universal drive bays that are compatible with different types of storage devices that are configured with U.2 compatible connector interfaces.

The U.2 connector 150 of FIG. 1A may be utilized within an IHS to link the backplane of a rack server to storage devices inserted into the drive bays of the rack server. As illustrated in FIG. 1a, the U.2 connector 150 includes pins 170 and 185 that support up to four-lanes of PCIe traffic. These pins, along with pins 160, also provide support for certain PCIe reference clock and sideband signaling. The remaining pins 155, 165 and 175 provide support for SAS/SATA connections.

FIG. 2 is a high-level schematic diagram depicting certain components of a conventional backplane 205 that includes four drive bay connectors 210a-d that are each wired to utilize a four-lane PCIe connection. The drive bay connectors 210a-d may be U.2 connectors. The drive bay connectors 210a-d illustrated in FIG. 2 depict only notional PCIe connections and do not reflect actual pins that may comprise a PCIe connection made using a connector such as U.2 connector. The backplane 205 is configured to utilize a sixteen-lane PCIe bus connection provided via PCIe switch 230. The PCIe bus connection may be provided by components besides or in addition to PCIe switch 230. For instance, a sixteen-lane PCIe bus connection may instead be received from a PCIe bridge, a platform controller hub (PCH) that can serve as a PCIe controller card or similar component comprised within the chassis the of the rack server housing the backplane 205. The output of the PCIe switch 230 is provided to the backplane 205 via four cable connectors 215a-d. Bundled cables 225a-d are used to connect the four cable connectors 215a-d at the PCIe switch to four compatible cable connectors 220a-d provide by the backplane 205. As with the drive bay connectors 210a-d of the backplane 205, the illustrated cable connectors 220a-d and 225a-d depict only notional PCIe connections and not the actual pins utilized in a PCIe connection. Each bundled cable 225a-d includes the wiring for four lanes of PCIe traffic. As with connectors 215a-d and 220a-d, bundled cables 225a-d are illustrated in a manner that depicts a notional PCIe connection, not the actual wires that would comprise a PCIe connection made using a four-lane, bundled cable connecting two U.2 connectors. The cables, cable connectors and drive bay connectors described with respect to the backplanes of FIGS. 3-6 are illustrated using these same notional simplifications.

As described, PCIe supports the grouping of the lanes that comprise the bus into high-bandwidth, multi-lane PCIe links. The greater the number of lanes within a grouping, the higher the bandwidth of the link. One limitation of PCIe's support for linking multiple lanes in this manner is that lanes within a grouping must be consecutively ordered lanes within the PCIe bus connection that is provided by the PCIe switch 230. In the backplane of FIG. 2, drive bay connectors 210a-d are each wired for use with a four-lane PCIe link. In accordance with the lane ordering requirements, lanes 1-4 of the PCIe bus connection are used by drive bay 210a. Drive bay 210b utilizes the next four consecutive lanes, 5-8. In this same manner, drive bays 210c-d utilize the remaining consecutive lanes.

Since the backplane 205 is configured to utilize the available 16 lanes of the PCIe bus connection in support of drive bay connectors 210a-d, the remaining drive bay connectors 210e-h may be utilized to connect to storage devices that do not utilize PCIe, such as SATA and SAS storage devices. In certain applications, the available sixteen lanes of PCIe bus bandwidth may be distributed differently within the drive bays of a rack server. For instance, the PCIe bandwidth may be distributed across eight storage device connections, rather than four.

FIG. 3 is a high-level schematic diagram depicting certain components of a another conventional backplane 305 that is configured to utilize eight drive bays 310a-h that are each wired to utilize a two-lane PCIe connection. As with the backplane 205 of FIG. 2, the sixteen-lane PCIe bus connection is provided to the backplane 305 using four bundled cables 325a-d, where each bundled cable carries four consecutively-ordered lanes of the PCIe bus connection. As before, each of the four cables 325a-d interfaces with a cable connector 315a-d of a PCIe switch 330.

As opposed to the backplane of FIG. 2, each of the cables 325a-d is connected to backplane 305 via a drive bay connector 320a-d that is wired to two neighboring drive bays. The drive bay connectors 320a-d may be U.2 connectors, such as described with respect to FIG. 1A. The PCIe bus connection wires from cable 325 are split between drive bays 310a and 310b. Each of the two drive bays 310a-b utilizes a two-lane PCIe link. Consistent with the requirement that consecutively-ordered PCIe lanes be used in a multi-lane line, consecutive lanes are used for the two-lane PCIe lines wired for each drive bay. For instance, the four lanes from cable 320a are split such that drive bay 310a is wired to use a two-lane PCIe link comprised of lanes 1-2 and drive bay 310b is wired to use a two-line PCIe link comprised of lanes 3-4.

Figure 4:
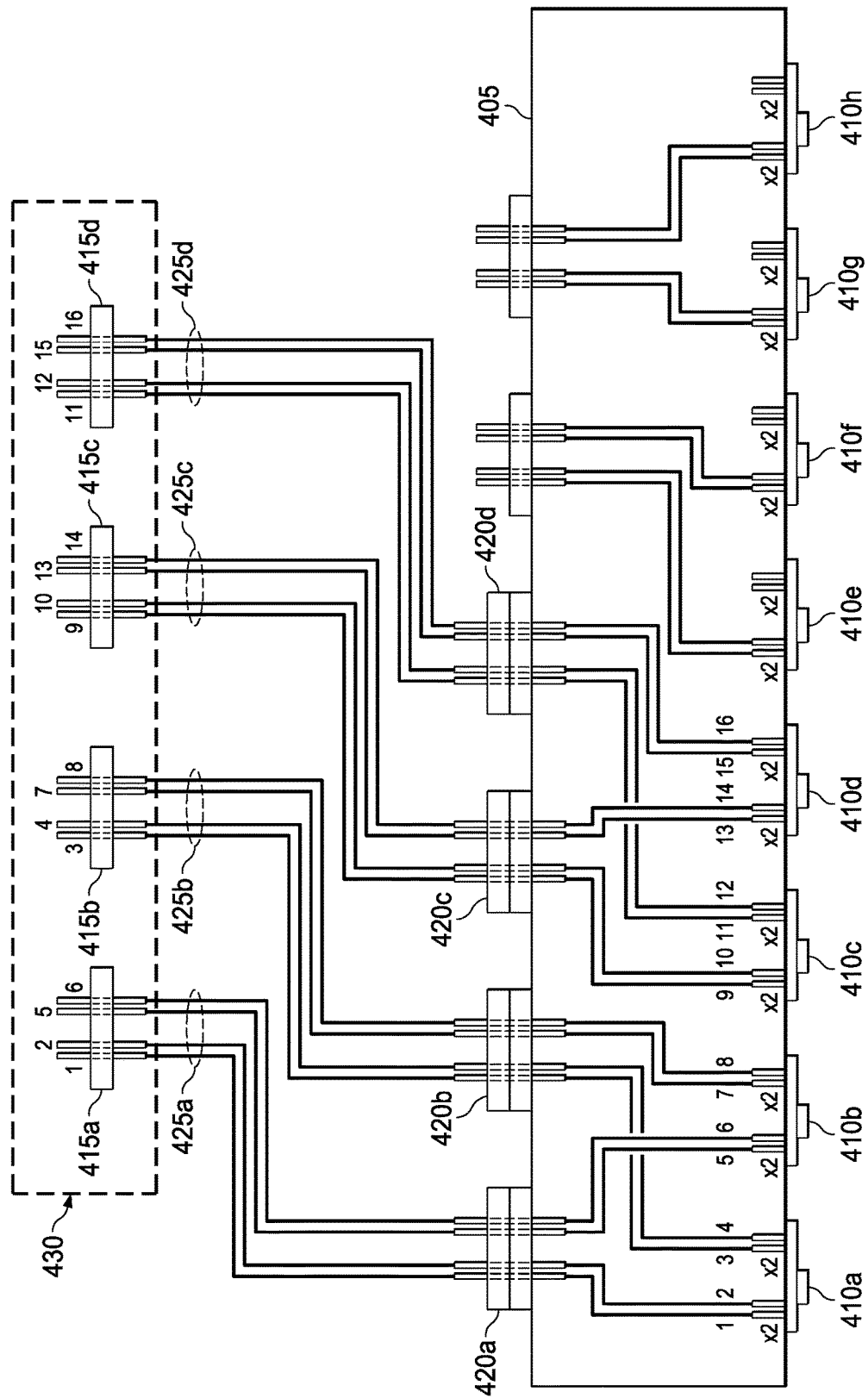
FIG. 4 is a high-level schematic diagram depicting certain components of a backplane in a first configuration according to various embodiments.

FIG. 4 is a high-level schematic diagram depicting certain components of a backplane 405 configured according to various embodiments. In the embodiment of FIG. 4, the backplane 405 is configured to support eight drive bay connections 410a-h. Other embodiments may include different numbers of drive bays. In certain embodiments, each of the drive bays is universal in that it is has been configured to operate with various different types of storage devices. For instance, in certain embodiments, drive bays connectors 410a-h may be U.2 connectors capable of interfacing with compatible SAS, SATA, and solid-state (via PCIe) storage devices. With respect to support for PCIe, the backplane 405 is configured to support both two-lane and four-lane PCIe links at each of the drive bay connectors 410a-h.

As with the backplanes of FIGS. 2 and 3, the sixteen-lane PCIe bus connection is provided to the backplane 405 using four bundled cables 425a-d, where each bundled cable is able to carry four lanes of the PCIe bus connection. As before, each of the four cables 425a-d interfaces with one of the cable connectors 415a-d of a PCIe switch 430 or cable connectors provided by a similar component. Unlike the backplanes of FIGS. 2 and 3, each of the four cables 425 a-d that connect backplane 405 to the PCIe bus connection do not transmit consecutively ordered PCIe lanes. Instead, cable 425a transmits PCIe lanes 1-2 and 5-6, cable 425b transmits PCIe lanes 3-4 and 7-8, cable 425c transmits PCIe lanes 9-10 and 13-14 and cable 425d transmits PCIe lanes 11-12 and 15-16. Even though the individual cables 425a-d do not transmit consecutively ordered PCIe lanes, the PCIe connections provided by backplane 405 are routed by the backplane 405 to provide each drive bay with multi-lane PCIe links comprised of consecutively ordered lanes.

According to various embodiments, the distribution of ordered PCIe lanes among the four bundled cables 425a-d is assigned via configuration of the PCIe switch 430 to which the cables 425a-d are connected. Other embodiments may rely on the configuration of components other than or in addition to a PCIe switch 430 to assign the lanes that comprise the PCIe bus connection among the four bundled cables 425a-d according to the ordering illustrated in FIG. 4. The particular ordering of PCIe lanes is selected such that a backplane according to embodiments can be configured to utilize four PCIe lanes or two PCIe lanes for each drive bay. This configuration of the backplane is accomplished by the selection of connectors by which the cables are connected to the backplane.

In the embodiment of FIG. 4, four cable connectors 420a-d are utilized by the backplane 430 to receive the PCIe bus connection provided via the cables 425a-d. As illustrated, the connections provided by the four cable connectors 420a-d are each wired in the backplane 405 such that each of the four drive bay connectors 410a-d is connected to four consecutively ordered PCIe lanes. For instance, drive bay connector 410a is wired to utilize PCIe lanes 1-2 received as inputs from cable connector 420a and PCIe lanes 3-4, received as inputs from cable connector 420b. Each of drive bay connectors 410b-d are similarly wired to obtain two consecutive PCIe lanes from two different cable connectors provided as inputs to the backplane 405. Configured in this manner, each of the four drive bay connectors 410a-d supports high-bandwidth storage operations via a four-lane PCIe link.

In the configuration of FIG. 4, all of the available bandwidth of the PCIe bus connection is distributed among drive bay connectors 410a-d. In certain configurations, non-PCIe storage devices may be utilized by drive bay connectors 410e-h. In certain scenarios, it is preferable to instead distribute the available PCIe bus bandwidth across more drive bays. In such scenarios, the PCIe bus bandwidth is distributed between more storage devices in order to increase storage capacity at the expense of the bandwidth that is available at each individual storage device. For instance, eight storage devices can be accommodated by the sixteen-wire PCIe bus connection of FIG. 4 if each storage device is configured to utilize two-lane PCIe links. Both scenarios can be accommodated conventionally using two different types of backplanes, such as the backplanes of FIGS. 2 and 3. Embodiments provide the ability to support both configurations with a single backplane. This provides manufacturers, suppliers and customers the benefit of a single backplane that is configurable for both purposes.

In addition to providing multiple configurations using a single backplane, embodiments do so utilizing standard PCIe cabling and connectors. As described, embodiments utilize particular re-ordering of the PCIe lanes among the cables connecting to the backplane. In the embodiment of FIG. 4, for instance, lanes 1-2 and 5-6 are grouped at cable connector 415a of the PCIe switch 430 and routed to cable connector 420a of the backplane. A similar re-ordering of PCIe lanes may instead be achieved using cables that are designed to switch the ordering of the lanes. Such specially-designed cables would be used to establish crossovers between certain of the lanes. Such special-purpose cables are expensive and support for multiple versions of such cables would be required for each different configuration of multi-lane PCIe links that is to be supported.

Embodiments provides the ability to support multiple configurations using standard cabling and connectors and without the complexity and cost of additional electronics on the backplane. Multiple distributions of PCIe lanes could instead be supported using additional electronic backplane components, such as a multiplexer, that could provide different options for routing PCIe bus data to different destinations. Components such as multiplexers add cost and complexity that is avoided by utilizing embodiments that can provide configurability without adding electronic components to the backplane.

Figure 5:
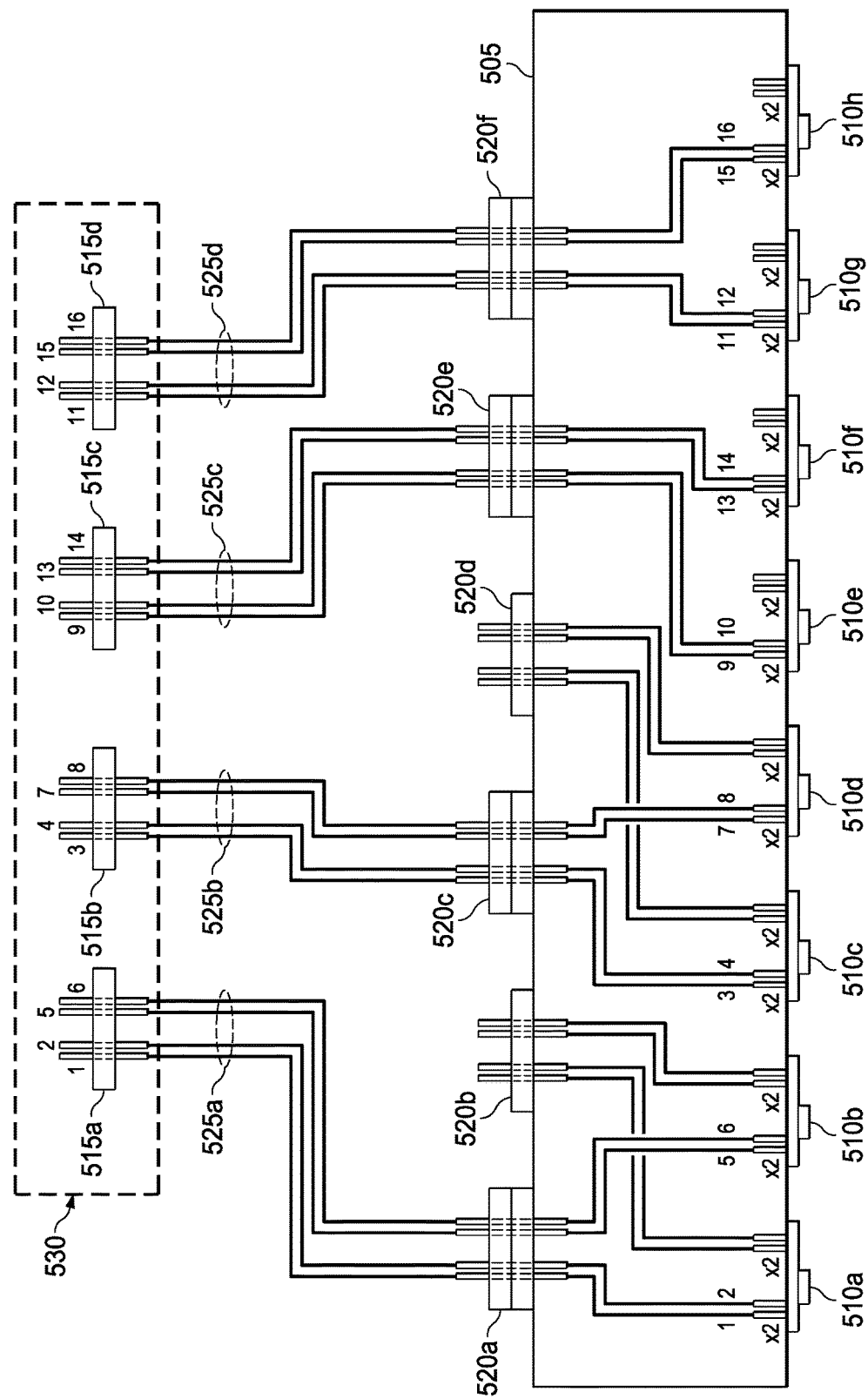
FIG. 5 is a high-level schematic diagram depicting certain components of a backplane in a second configuration according to various embodiments.

FIG. 5 is a high-level schematic diagram depicting certain components of a backplane 505 configured according to various embodiments to provide two-lane PCIe links for eight storage devices 510a-h. As with the backplanes describe above, a sixteen-lane PCIe bus connection is provided to the backplane 505 using four bundled cables 525a-d, where each bundled cable carries four lanes of the PCIe bus connection. As before, each of the four cables 525a-d interfaces with a cable connector 515a-d of a PCIe switch 530 or cable connectors provided by a similar component.

The backplane 505 provides two-lane PCIe links to each of the eight storage bay connectors 510a-h by utilizing a different combination of the cable connectors that are provided by the backplane 505. Cable 525a remains connected to the same cable connector 520a of the backplane as in the configuration of FIG. 4. Cable 525b is now connected to cable connector 520c of backplane 505. Configured in this manner, drive bay connector 510a is still connected to PCIe lanes 1-2 received from cable connector 520a. However, these two PCIe lanes 1-2 are now the only PCIe lanes connected to drive bay connector 510a, since there is no cable input at cable connector 520b. Drive bay connector 510b is similarly still connected to lanes 5-6, also received from cable connector 520a is now configured for use of a two-lane PCIe link. Cable connectors 520b and 520d are not used in this configuration.

The remaining drive bay connectors 510e-h are wired using cable connectors 520e and 520f of backplane 505. These two cable connectors 520e-f were not utilized in the configuration of FIG. 4. Cable 525c is now connected to cable connector 520e, providing two-lane PCIe links to drive bay connectors 510e and 510f. Cable 525d is now connected to cable connector 520f and provides two-lane PCI links to drive bay connectors 510g and 510h. Configured in this manner, each drive bay connector 510a-h is wired to utilize a two-lane PCIe link and maintains the use of consecutively numbered lanes in each two-lane PCIe link used by each of the drive bays. The same cables 525a-d may be used for the configurations of FIGS. 4 and 5. The backplane 505 is reconfigured between the configurations of FIGS. 4 and 5 by switching the cables to different cable connectors provided by the backplane.

Figure 6:
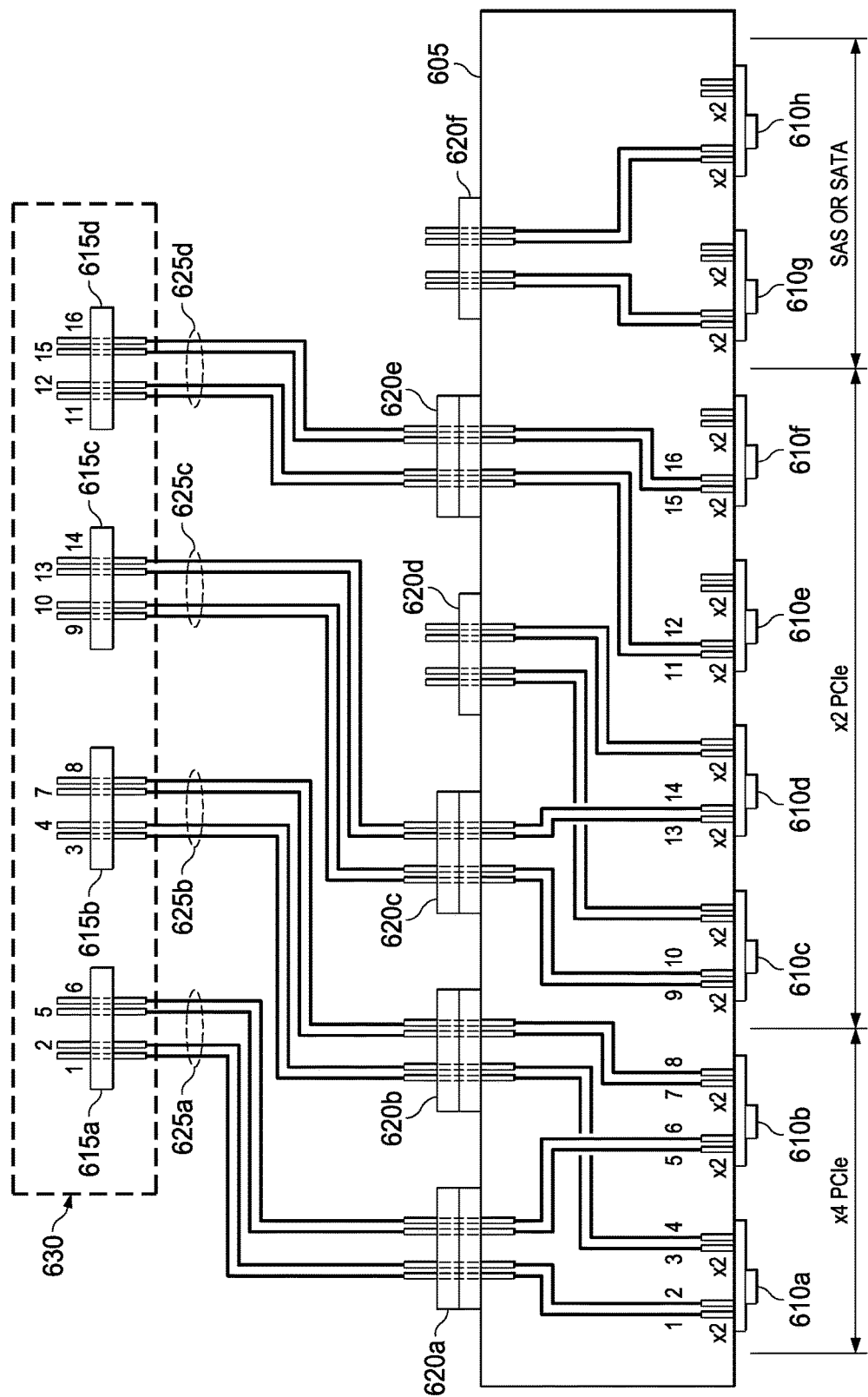
FIG. 6 is a high-level schematic diagram depicting certain components of a backplane in a third configuration according to various embodiments.

FIG. 6 is a high-level schematic diagram depicting certain components of a backplane 605 configured according to various embodiments to support multi-lane PCIe links with tiered bandwidth. In the configuration of FIG. 6, drive bay connectors 610a and 610b are configured to utilize four-lane PCIe links and drive bay connectors 610c-f are configured to utilize two-lane PCIe links. The remaining drive bay connectors 610g and 610h may be utilized for non-PCIe storage devices, such as SATA or SAS drives that are compatible with the drive bay connectors 610g and 610h. Configured in this manner, the backplane 605 provides tiered bandwidth to the drive bay connectors 610a-h. Such configuration allows overall bandwidth to be allocated more flexibly among the drive bay connectors 610a-h.

As in the backplanes of FIGS. 4 and 5, the configuration of FIG. 6 is achieved through the selection of cable connectors 620a-f provided backplane 605. As with the configuration of FIG. 4, four-lane PCIe links are wired to drive bay connectors 610a and 610b using cable connectors 620a and 620b. Similar to the configuration of FIG. 5, two-lane PCIe links are wired to drive bay connectors 610c-f using cable connectors 620c and 620e. The configuration of FIG. 6 may utilize the same PCIe bus input connection from PCIe switch 630 and the same cables and connectors described with respect to FIGS. 4 and 5.

Embodiments provide the ability to reconfigure the PCIe lanes provided to drive bays of a backplane based on the selection of cable connectors that are provided by the backplane. In a rack of potentially identical rack servers, administrators prefer having to determine the configuration of a rack server without inspection of the cables that connect to the back of each rack component. According to certain embodiments, a backplane provides status lights that communicate the configuration status of each drive bay. For instance, each of the drive bays of a rack server may be configured to utilize a status light such as an LED light. In such embodiments, cable detect pins are utilized on at least some of the PCIe cable connectors. The use of cable detect pins can determine the cable connectors that are being utilized as inputs to the backplane. If, for instance, a cable connector combination is detected that provides a two-lane PCIe link as an input to a drive bay, an LED associated with that drive bay may be illuminated in a first manner. If a different combination of cable connectors is detected that provides a four-lane PCIe link as an input to the drive bay, the LED may be illuminated in a second manner. In some embodiments, the color of the status light reflects whether a drive bay is configured as a two-lane or four-lane PCIe link. The use of status lights may also reflect whether a drive bay is not wired for PCIe and thus may only support other types of storage devices, such as SATA or SAS drives.

Certain embodiments may provide the ability to number the drive bays of a blade server in order to adhere to administrative preferences or policies. According to the above embodiments, the PCIe multi-lane links that are wired to each drive bay utilize consecutively ordered lanes, but neighboring drive bays in the backplane do not utilize consecutively ordered lanes. For instance, in the blade server 505 of FIG. 5, drive bay connector utilizes lanes 1-2 and drive bay connector utilizes lanes 5-6. This results in administrators having to take this specific ordering into account when addressing drive bays in the backplane. Certain embodiments provide the ability to adjust the drive bay numbers used by administrators. In such embodiments, cable detect pins in each of the backplane connectors may be routed to BIOS GPIO pins of a controller or processor, such as a management controller, of the backplane. Upon booting, the management controller utilizes the detection of cables connected to each of the PCIe backplane connectors to determine the PCIe lanes being utilized by each of the drive bays. The BIOS is then used to mask the numbers assigned to each of the drive bays such that the lanes used by administrators in addressing the drive bays adhere to a policy or preference.

In the configuration of FIG. 6, no bandwidth on the PCIe bus is available for drive bay connectors 610g and 610h. As described, certain embodiments will support the use of non-PCIe storage devices in drive bay connectors 610g and 610h. In certain embodiments, additional PCIe bus bandwidth may be provided by an additional PCIe bridge card or similar component. In such embodiments, the available bandwidth of the second PCIe bus may be provided to drive bay connectors 610g and 610h in two-lane or four-lane PCIe links based on the selection of cable connectors provided by the backplane.

In the configurations of FIGS. 2-6, failure of the single PCIe bridge providing the PCIe bus connection may result in loss of connectivity to all of the storage devices configured to utilize the PCIe bus. Embodiments configured to utilize multiple PCIe buses provide failover protection by routing PCIe lanes to drive bays from two different PCIe bus connections. For instance, a backplane according to certain embodiments receives two PCIe bus connections via two PCIe bride cards or similar device. In one configuration, two-lane PCIe links from each PCIe bus connection are routed to each drive bay. In this configuration, each drive bay has the ability to establish two-lane PCIe links via two different PCIe bus connections to the backplane.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A backplane configured to receive a PCIe bus connection, the backplane comprising:
   a plurality of drive bay connectors, wherein each drive bay connector provides a PCIe link to a storage device;
   a first cable connector configured to route a first pair of PCIe lanes from the PCIe bus connection to a first drive bay connector of the plurality of drive bay connectors; and
   a second cable connector configured to route a second pair of PCIe lanes from the PCIe bus connection to the first drive bay connector, wherein the first pair of PCIe lanes and the second pair of PCIe lanes are consecutively numbered PCIe lanes of the PCIe bus connection, wherein the first drive bay connector provides a two-lane PCIe link established via the first pair of PCIe lanes, wherein the first drive bay connector provides a four-lane PCIe link established via the first pair of PCIe lanes and the second pair of PCIe lanes, and wherein the first drive bay connector is associated with a first status indicator if provided with a two-lane PCIe link and is associated with a second status indictor if provided with a four-lane PCIe link.

2. The backplane of claim 1, wherein the first cable connector is connected the PCIe bus connection via a first four-lane cable and wherein the second cable connector is connector the PCIe bus connection via a second four-lane cable.

3. The backplane of claim 2, wherein the first pair of PCIe lanes is provided via the first four-lane cable and the second pair of PCIe lanes is provided via the second four-lane cable.

4. The backplane of claim 3, wherein a third pair of PCIe lanes is routed to a second drive bay connector of the plurality of drive bay connectors via the first four-lane cable.

5. A rack server system, comprising:
a processor;
a PCIe switch configured to provide a PCIe bus connection;
a chassis housing a backplane; and
the backplane comprising
 a plurality of drive bay connectors, wherein each drive bay connector provides a PCIe link to a storage device;
 a first cable connector configured to route a first pair of PCIe lanes to a first drive bay connector of the plurality of drive bay connectors; and
 a second cable connector configured to route a second pair of PCIe lanes to the first drive bay connector, wherein the first pair of PCIe lanes and the second pair of PCIe lanes are consecutively numbered PCIe lanes of the PCIe bus connection, wherein the first drive bay connector provides a two-lane PCIe link established via the first pair of PCIe lanes, wherein the first drive bay connector provides a four-lane PCIe link established via the first pair of PCIe lanes and the second pair of PCIe lanes, wherein the first cable connector is connected to the PCIe bus connection via a first four-lane cable and wherein the second cable connector is connector the PCIe bus connection via a second four-lane cable, wherein the first pair of PCIe lanes is provided via a first four-lane cable and the second pair of PCIe lanes is provided via the second four-lane cable, wherein a third pair of PCIe lanes is routed to a second drive bay connectors of the plurality of drive bays via the first four-lane cable, and wherein the first drive bay connector is associated with a first status indicator if provided with a two-lane PCIe link and is associated with a second status indictor if provided with a four-lane PCIe link.

6. An Information Handling System (IHS), comprising:
a plurality of drive bay connectors, wherein each drive bay connector provides a PCIe link to a storage device;
a first cable connector configured to route a first pair of PCIe lanes from a PCIe bus connection to a first drive bay connector of the plurality of drive bay connectors; and
a second cable connector configured to route a second pair of PCIe lanes from the PCIe bus connection to the first drive bay connector, wherein the first pair of PCIe lanes and the second pair of PCIe lanes are consecutively numbered PCIe lanes of the PCIe bus connection, wherein the first drive bay connector provides a two-lane PCIe link established via the first pair of PCIe lanes, wherein the first drive bay connector provides a four-lane PCIe link established via the first pair of PCIe lanes and the second pair of PCIe lanes, and wherein the first drive bay connector is associated with a first status indicator if provided with a two-lane PCIe link and is associated with a second status indictor if provided with a four-lane PCIe link.

7. The IHS of claim 6, wherein the first cable connector is connected the PCIe bus connection via a first four-lane cable and wherein the second cable connector is connector the PCIe bus connection via a second four-lane cable.

8. The IHS of claim 7, wherein the first pair of PCIe lanes is provided via the first four-lane cable and the second pair of PCIe lanes is provided via the second four-lane cable.

9. The IHS of claim 8, wherein a third pair of PCIe lanes is routed to a second drive bay connector of the plurality of drive bay connectors via the first four-lane cable.

* * * * *